//  US007583659B2

(12) United States Patent
Matsuhashi et al.

(10) Patent No.: US 7,583,659 B2
(45) Date of Patent: Sep. 1, 2009

(54) MEDIA GATEWAY AND AUTOMATIC TELEPHONE CALL REDIRECTING SERVICE SYSTEM

(75) Inventors: Satoshi Matsuhashi, Yokahama (JP); Toshiyuki Matsuda, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 961 days.

(21) Appl. No.: 10/901,500

(22) Filed: Jul. 27, 2004

(65) Prior Publication Data

US 2005/0141528 A1    Jun. 30, 2005

(30) Foreign Application Priority Data

Dec. 25, 2003   (JP)   ............................. 2003-429115

(51) Int. Cl.
*H04L 12/66* (2006.01)
(52) U.S. Cl. .................... 370/352; 370/353; 370/356; 379/211.01; 379/265.09; 709/230
(58) Field of Classification Search ................ 370/352, 370/356, 353; 709/249, 230; 379/211.01, 379/265.09, 88.17
See application file for complete search history.

(56) References Cited

U.S. PATENT DOCUMENTS

| | | | | |
|---|---|---|---|---|
| 6,253,249 | B1* | 6/2001 | Belzile ......................... | 709/249 |
| 6,282,193 | B1* | 8/2001 | Hluchyj et al. .............. | 370/356 |
| 6,535,507 | B1* | 3/2003 | Li et al. ....................... | 370/356 |
| 6,614,780 | B2* | 9/2003 | Hakim et al. ................ | 370/352 |
| 6,895,002 | B2* | 5/2005 | Shah et al. ................... | 370/356 |
| 6,987,756 | B1* | 1/2006 | Ravindranath et al. ...... | 370/352 |
| 7,203,186 | B1* | 4/2007 | Fuller et al. ................. | 370/352 |
| 7,239,629 | B1* | 7/2007 | Olshansky et al. .......... | 370/353 |
| 7,277,421 | B1* | 10/2007 | Pershan ....................... | 370/352 |
| 7,280,530 | B2* | 10/2007 | Chang et al. ................ | 370/352 |

(Continued)

FOREIGN PATENT DOCUMENTS

JP    07-162529    6/1995

(Continued)

OTHER PUBLICATIONS

"How to bridge PSTN and IP network for call routing? How is relation with IP telephone services?" Journal Nikkei Communications (Aug. 2000).

(Continued)

*Primary Examiner*—Gerald Gauthier
(74) *Attorney, Agent, or Firm*—Townsend and Townsend and Crew LLP

(57) ABSTRACT

A media gateway built in an exchange comprises a media gateway control unit connected to a control unit of the exchange, a first protocol processing unit for executing a call connection procedure according to a first call control protocol with an IP call connection controller on the IP network, and a second protocol processing unit for executing a call connection procedure according to a second call control protocol with the IP call connection controller. The media gateway control unit instructs the first protocol processing unit to start call connection processing in response to a call connection command from a PSTN telephone, aborts the call connection processing of the first protocol processing unit when receiving a connection protocol change command from the IP call connection controller before completing the call connection according to the first protocol, and instructs the second protocol processing unit to execute call connection processing.

10 Claims, 8 Drawing Sheets

U.S. PATENT DOCUMENTS

2002/0052964 A1* 5/2002 Ferner et al. .............. 709/230
2003/0152209 A1* 8/2003 Andreason ............ 379/211.01
2004/0042444 A1* 3/2004 Edmon et al. .............. 370/352
2005/0135598 A1* 6/2005 Badt et al. ............ 379/265.09

OTHER PUBLICATIONS

"Development and Release of a VoIP Service System," NTT Corporation Research and Development 2003 Review of Activities available at http://www.ntt.co.jp (Mar. 2003).

* cited by examiner

FIG. 4

DATA BASE FOR AUTOMATIC CALL REDIRECTING SERVCE 7

| CALLED TELEPHONE NUMBER (71) | FORWARDING DESTINATION TELEPHONE NUMBER (72) | EXCHANGE'S CODE FOR REDIRECTED TELEPHONE (73) | FORWARDING DESTINATION IP ADDRESS (74) |
|---|---|---|---|
| 050-8888-8888 | 03-2222-2222 | 03-22 | 100.10.10.20 |
| 050-3333-3333 | 050-7777-7777 | — | 100.10.10.50 |
| ⋮ | ⋮ | ⋮ | ⋮ |
| 050-6666-6666 | — | — | — |

MEDIA GATEWAY AND AUTOMATIC TELEPHONE CALL REDIRECTING SERVICE SYSTEM

CLAIM OF PRIORITY

The present application claims priority from Japanese application serial no. 2003-429115, filed on Dec. 25, 2003, the content of which is hereby incorporated by reference into this application.

BACKGROUND OF THE INVENTION

1. Field of the Invention

The present invention relates to automatic telephone call redirecting service systems. More specifically, the invention relates to a media gateway, IP call connection controller, and automatic telephone call redirecting service system for redirecting an incoming call on an IP telephone to a forwarding destination telephone which has been registered beforehand in a network configuration that interconnects IP telephones and PSTN telephones.

2. Description of the Related Art

In conventional Public Switched Telephone Networks (PSTNs), a plurality of packet exchanges (packet switches) operate relationally through common-channel interoffice signaling and thereby provide high intelligent telephone services. One of the high intelligent services is, for example, automatic call redirecting that redirects an incoming call on a subscriber telephone to another telephone having been designated beforehand when the subscriber is away from where his or her telephone is.

The automatic call redirecting service is realized such a way that a called side exchange refers to a data base that indicates correspondence between a called telephone number and a forwarding destination telephone number and determines a forwarding destination telephone number, for example, as described in JP-A No. Hei 7-162529 (Related art 1). If a forwarding destination telephone is accommodated by another exchange, a call connection between a calling telephone and the forwarding destination telephone is established by-communicating control signals between the called-side exchange and the forwarding destination exchange via a common channel signaling network, for example, as presented in the Aug. 7, 2000 issue of the journal Nikkei Communications, p. 103, FIG. 3.

While the PSTNs provide the automatic call redirecting service by the above-described method, integration of PSTN and IP (Internet Protocol) network has lately been advancing and there is a need to extend various telephone services that have so far been provided by the PSTNs to IP telephones.

Connection between a PSTN and an IP network is realized by using a media gateway (MG) for performing conversion between Synchronous Transfer Mode (STM) voice signal data on the PSTN and IP voice packets, a signaling gateway (SG) for connecting a common channel signaling network and the IP network to transfer control signals, and a call agent (CA) for converting a common channel signal received by the signaling gateway SG into a control signal for the media gateway MG, such as, MGCP and the like, thereby to control the MG, for example, as presented in the Aug. 7, 2000 issue of the journal Nikkei Communications, "How to bridge PSTN and IP network for call routing? How is relation with IP telephone services?" (Related art 2), p. 105, FIG. 5.

According to this method, since the control signals can be communicated between the IP network and exchanges existing in the PSTN by accommodating common channel signals to both the signaling gateway SG and call agent CA, it is possible to provide services equivalent to that have been implemented on the existing PSTNs to IP telephones as well.

However, telephone network service providers desire to minimize the investment in infrastructures for call interconnection between PSTN and IP network. Therefore, a system configuration that requires a plurality of sets of expensive communications apparatuses such as media gateways MGs, signaling gateways SGs, and call agents CAs, as presented in related art 2, is not a favorable solution for communications service providers, because the cost of these apparatuses is high and they need to establish a new maintenance and operation system in the IP network side.

With regard to this problem, for example, in "Development and Provisioning of a Voice Service System" (related art 3) posted in "NTT Research and Development 2003 Review of Activities" on an NTT Corporation's web site/home page (http://www.ntt. co.jp/RD/OFIS/active/2003pdf/nw13.pdf), it is proposed to omit the signaling gateways SGs by communicating control signals in the IP telephone network side across the IP network instead of the common channel signaling network.

SUMMARY OF THE INVENTION

As an economical configuration of the IP telephone network, it is feasible, for example, to provide an existing exchange in the PSTN with the media gateway (MG) functionality and install a general-purpose call connection controller such as a Session Initiation Protocol (SIP) server on the IP network. This network configuration dispenses with the apparatuses such as the SGs and CAs and enables application of the same maintenance and operation system as for the existing exchanges. In the following description, a media gateway built in a PSTN exchange will be particularly referred to as an exchange built-in type media gateway MG.

The network configuration employing the SIP server connected to the IP network and exchange built-in type media gateways MGs enables not only making connection between a PSTN telephone and an IP terminal such as an IP telephone and a voice guidance device, but also connecting one exchange built-in type media gateway MG to another exchange built-in type media gateway MG via the IP network for voice signal relaying transmission via the IP network.

For the purpose of connection between a PSTN telephone and an IP terminal, a general-purpose protocol like the SIP specified in RFC 3261 is suitable. However, for the purpose of voice signal relay transmission, for example, SIP for telephones (SIP-T) specified in RFC 3204 is suitable because communication of control signals like ISDN User Part (ISUP) which are communicated between conventional. PSTN network exchanges via the common channel signaling network are required. That is, if it is desired, by using exchange built-in type media gateways, to support both the connection between a PSTN telephone and an IP terminal and relaying transmission between the exchanges via the IP network, a plurality of call control protocols like the above SIP and SIP-T must be used as appropriate.

For example, in the case where an incoming call addressed to an IP telephone has to be redirected to a PSTN telephone through the automatic call redirecting service, the connection to the IP telephone according to the SIP process being carried out must be switched, in the middle of the call connection sequence, to a call relay connection between exchanges according to the SIP-T process. However, conventional IP network technology is not responsive to such call control protocol change during the call connection sequence. That is, conventional IP network has no mechanism to continue the call connection procedure flexibly in response to the switching of protocol from one to another. Consequently, it was impossible to realize call connection through the automatic call redirecting service that automatically redirects an incoming call on an IP telephone (or IP terminal) to another IP terminal which has been previously registered as a forwarding destination or another PSTN telephone connected via another exchange.

It is an object of the present invention to provide an economical network configuration that enables mutual call connection between a PSTN and an IP network.

It is another object of the present invention to provide a media gateway and an IP call connection controller making it possible to switch from one to another call control protocol during a call connection procedure.

It is a further another object of the present invention to provide an automatic call redirecting service system that can automatically redirect an incoming call on an. IP telephone to another IP terminal or another PSTN telephone connected via another exchange.

In order to achieve the foregoing objects, as one aspect, the present invention provides a media gateway to be built in an exchange capable of accommodating a plurality of PSTN telephones for performing conversion between voice signals and IP packets. The media gateway comprises a media gateway control unit connected to a control unit of the exchange, an IP network interface connected to an IP network, a first protocol processing unit for executing a call connection procedure according to a first call control protocol by communicating messages with an IP call connection controller on the IP network via the IP network interface, and a second protocol processing unit for executing a call connection procedure according to a second call control protocol by exchanging messages with the IP call connection controller via the IP network interface.

The media gateway is characterized in that the media gateway control unit instructs the first protocol processing unit to start call connection processing according to the first call control protocol in response to a call connection command issued from the exchange control unit when a call is originated from any of said PSTN telephones, aborts the call connection processing of the first protocol processing unit upon receiving a connection protocol change command from the IP call connection controller via the IP network interface before completing the call connection according to the first call control protocol, and instructs said the protocol processing unit to start call connection processing according to the second call control protocol.

More specifically, the media gateway is characterized in that the media gateway control unit instructs the first protocol processing unit to start call connection processing according to the first call control protocol when a called terminal specified in the call connection command is an IP terminal connected to the IP network, and instructs the second protocol processing unit to start call connection processing according to the second call control protocol when the called terminal is a PSTN telephone-which belongs to another exchange connected to the IP network.

Here, the first call control protocol is, for example, a Session Initiation Protocol (SIP) specified in RFC 3261 and the second call control protocol is, for example, a SIP for Telephone (SIP-T) specified in RFC 3204.

In another aspect, the present invention provides an automatic call redirecting service system comprising an exchange capable of accommodating a plurality of Public Switched Telephone Network (PSTN) telephones and an IP call connection control server connected to an IP network.

The exchange is provided with a built-in type media gateway connected to the IP network for performing conversion between voice signals and IP packets. The media gateway is comprised of a media gateway control unit connected to a control unit of the exchange, an IP network interface connected to the IP network, a first protocol processing unit for executing a call connection procedure according to a first call control protocol by communicating messages with the IP call connection control server via said IP network interface, and a second protocol processing unit for executing a call connection procedure according to a second call control protocol by communicating messages with the IP call connection control server via the IP network interface.

The IP call connection control server is comprised of a data base for storing a plurality of entries each indicating a forwarding destination telephone number and a forwarding destination IP address in correspondence with a registered telephone number, and a server control unit for referring to the data base, upon receiving a call connection request from the media gateway, based on a called telephone number specified in the call connection request to judge whether the protocol of the call connection request is appropriate or not, depending on whether the called telephone number is registered in the data base and the type of the forwarding destination telephone number registered in correspondence with the called telephone number, and sending a connection protocol change command to the media gateway if it is judged that the call control protocol of the call connection request is inappropriate.

The automatic call redirecting service system is characterized in that the media gateway control unit instructs the first protocol processing unit to start call connection processing according to the first call control protocol in response to a call connection command issued from the exchange control unit when a call is originated from any of said PSTN telephones, aborts the call connection processing of the first protocol processing unit when receiving the connection protocol change command from the IP call connection control server via the IP network interface before completing the call connection according to the first call control protocol, and instructs the second protocol processing unit to start call connection processing according to the second call control protocol.

More specifically, the server control unit of the IP call connection control server refers to said data base upon receiving a call connection request from the media gateway, based on the called telephone number specified in the request, executes call connection processing with a forwarding destination terminal having the forwarding destination telephone number when the forwarding destination telephone number has been registered in correspondence with the called telephone number, and executes call connection processing with a terminal having the called telephone number when the called telephone number or the forwarding destination telephone number is not registered.

The server control unit sends the connection protocol change command when the protocol of the call connection request received from the media gateway is the first call control protocol and the forwarding destination telephone number registered in the data base is the number of a PSTN telephone. If the protocol of the call connection request is SIP specified in RFC 3261 and the forwarding destination telephone number registered in the data base is the number of a PSTN telephone, the server control unit sends a connection protocol change command to change the connection protocol from SIP to SIP-T specified in RFC 3204 to a node that sent said call connection request.

BRIEF DESCRIPTION OF THE DRAWINGS

FIG. 4 shows a structure of a data base for automatic call redirecting service;

DESCRIPTION OF THE PREFERRED EMBODIMENTS

Figure 3:
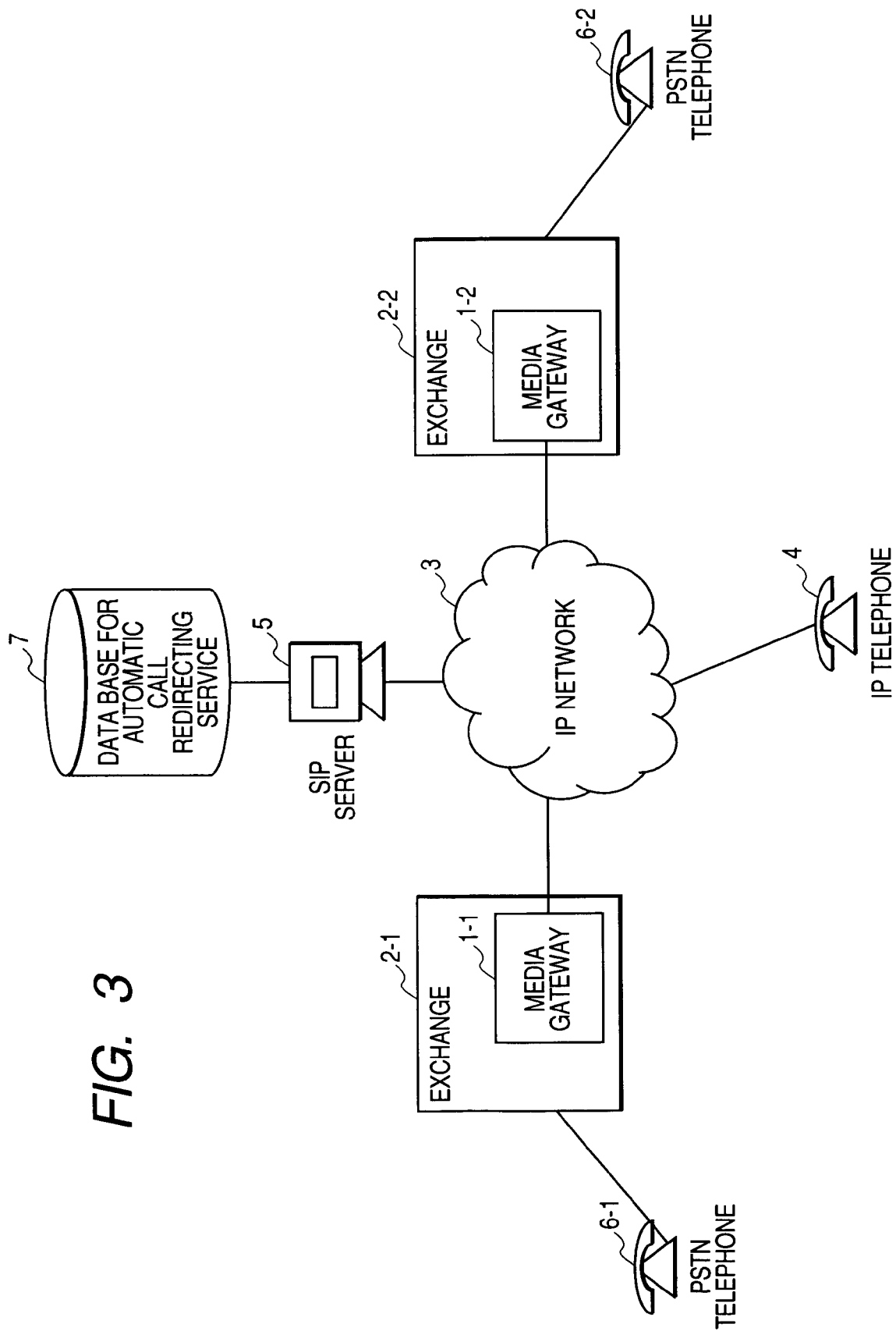
FIG. 3 is a diagram showing an example of an IP telephone network configuration to which the exchange including the built-in MG and the SIP server according to the present invention are applied.

FIG. 3 shows an example of an IP telephone network configuration capable of interconnecting between PSTN and IP network by applying exchange built-in type media gateways MGs and a SIP server according to the present invention.

Reference numerals 2 (2-1, 2-2) denote PSTN exchanges including built-in type media gateways MGs 1 (1-1, 1-2), respectively. Each of the PSTN exchanges accommodates general subscriber telephones 6 (6-1, 6-2) and is connected to an IP network 3 via the media gateways MGs 1. To the IP network 3, an IP telephone 4 and a SIP server 5 are connected.

By subscribing to the provider of the IP network 3, the owner of the IP telephone 4 is assigned an IP telephone number and allowed to access to the IP network. The subscriber's IP telephone number is managed as a subscriber line telephone number in the SIP server and each of the exchanges 2. When a call is originated from the IP telephone 4, the call signal is transferred to the SIP server 5. For example, when the IP telephone 4 originates a call to a general subscriber telephone 6 (6-1 or 6-2) on a PSTN, the SIP server 5 forwards the call signal to a media gateway MG 1 built in an exchange 2 nearest to the called telephone, according to the called number. The relation between the called telephone number and the media gateway MG 1 is stored in a data base DB 7 for automatic call redirecting service belonging to the SIP server 5.

In the above network configuration, for example, if a call originated from a PSTN telephone 6-1 to the IP telephone 4 has to be redirected to a PSTN telephone 6-2 by way of automatic call redirecting service in the existing PSTNs, the SIP server 5 which operates as a call connection controller in the IP telephony system must have functions for call forwarding. Further, the owner of the IP telephone 4 must register in advance the number of the forwarding destination PSTN telephone 6-2 to the data base 7 for automatic call redirecting service via the SIP server 5 by executing a forwarding destination telephone number registration procedure.

When the PSTN telephone 6-1 originates a call addressed to the IP telephone 4, the media gateway MG 1-1 sends a call connection request command (INVITE signal) to the SIP server 5. Upon receiving the call connection request command, the SIP server 5 retrieves the number of the forwarding destination telephone 6-2 from the data base 7, determines a forwarding destination media gateway MG 1-2 built in the exchange 2-2 that accommodates the forwarding destination telephone 6-2, and executes the call connection procedure with the forwarding destination media gateway MG 1-2 according to the SIP by exchanging SIP messages.

The media gateway MG 1-1 built in the calling side exchange 2-1 recognizes the call originated from the PSTN telephone 6-1 as the call addressed to the IP terminal and communicates with the SIP server 5, according to the call control protocol SIP. Likewise, the SIP server 5 also communicates with the forwarding destination media gateway MG 1-2, according to the SIP. On the other hand, the forwarding destination media gateway MG 1-2 having received the call connection request according to the SIP judges this call connection request as the one issued from the IP terminal, and executes the call connection processing in association with the exchange 2-2.

In this example, however, in the SIP call connection request command (INVITE signal), the source information specifies the number of the calling PSTN telephone 6-1, which differs from the expected IP telephone numbering scheme. Therefore, the forwarding destination exchange 2-2 judges that this call connection request comes from a telephone having a number out of its management, not from an IP telephone that it should serve, and ignores the call connection request command. Consequently, the automatic redirecting service is terminated incompletely.

As a solution to the above-described problem, for example, suppose that the SIP server 5 changes the source information in the call connection request command received from the calling side media gateway MG 1-1 so as to replace the telephone number of PSTN telephone 6-1 by the telephone number of the IP telephone 4.

In this case, the forwarding destination exchange 2-2 can establish the call connection with the forwarding destination telephone 6-2 because the calling number is the number of the IP telephone as expected. According to this method, if the forwarding destination telephone 6-2 has been set up to get a calling number display service, however, another problem arises. That is, the number displayed on the telephone 6-2 is the number of the IP telephone 4 and the number of the true calling telephone 6-1 cannot be notified to the called person.

To solve the problems, according to the present invention, the calling side media gateway MG 1-1 and the SIP server 5 are configured to switch the type of protocol to be applied to the call control from one to another in accordance with the status of call to be connected.

Figure 1:
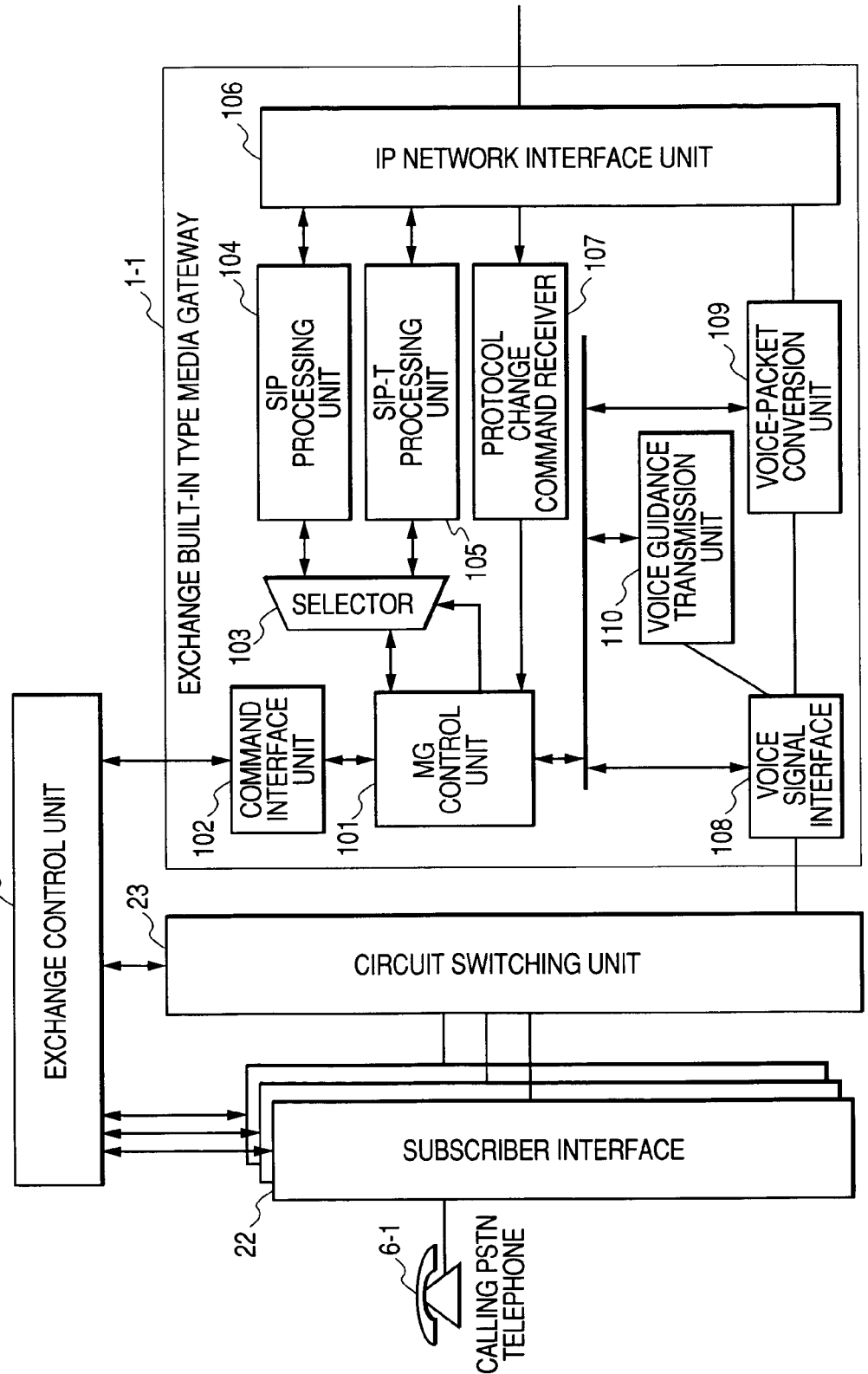
FIG. 1 is a block diagram showing an embodiment of an exchange 2-1 including a built-in MG provided with a protocol switching function according to the present invention.

FIG. 1 shows an embodiment of the exchange 2-1 including the built-in MG provided with a protocol switching function according to the present invention. The exchange 2-2 including the built-in MG also has the same structure as the exchange 2-1.

The exchange 2-1 is comprised of the media gateway MG 1-1 connected to the IP network 3, an exchange control unit 21 for controlling each of functions of the exchange, a plurality of subscriber interfaces 22 accommodating subscriber lines connected to PSTN telephones, respectively, a circuit switching unit 23 connected to the subscriber-interfaces 22 and the media gateway MG 1-1.

The media gateway MG 1-1 is comprised of: a MG control unit 101 for controlling each of functions of the MG; a command interface unit 102 for transferring commands internal to the exchange between the MG control unit 101 and the exchange control unit 21; an IP network interface unit 106 for communicating IP packets for call control data and IP packets for voice data with the IP network; a SIP processing unit 104 for executing the SIP call control protocol which is connected to the IP network interface unit 106; a SIP-T processing unit 105 for generating ISUP information and executing the SIP-T call control protocol which is connected to the IP network interface unit 106; a selector 103 for switching call control data paths so as to selectively connect either the SIP processing unit 104 or SIP-T processing unit 105 to the MG control unit 101 in accordance with call control protocol to be applied; a protocol change command receiver 107 for transferring a protocol change command issued from the SIP server and received by the IP network interface unit 106, to the MG control unit 101; a voice signal interface 108 for communicating voice signals with the circuit switching unit 23; a voice-packet conversion unit 109 for performing conversion between STM voice signals and voice packets which is connected between the IP network interface unit 106 and the voice signal interface 108; and a voice guidance transmission unit 110 for generating voice guidance to be announced to the caller when automatic call redirecting is carried out. The selector 103 switches the call control data paths from one to another in response to an instruction from the MG control unit 101.

Figure 2:
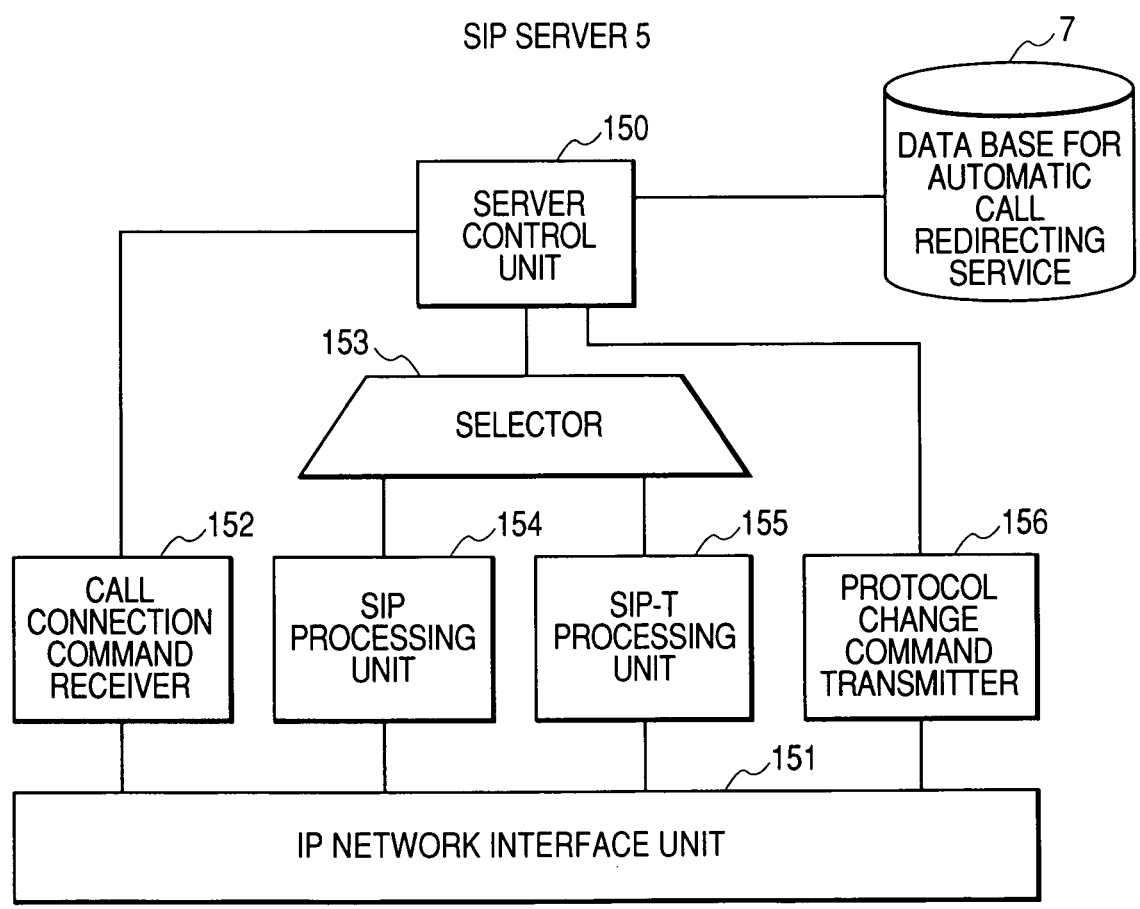
FIG. 2 is a block diagram showing an embodiment of a SIP server 5 provided with a protocol switching function applicable to the present invention.

FIG. 2 shows an embodiment of the SIP server 5 provided with a protocol switching function to be applied to the present invention.

The SIP server 5 of the present invention is comprised of: a server control unit 150 for controlling each of functional parts of the SIP server and selecting a protocol required to implement automatic call redirecting service, using the data base 7 for automatic call redirecting service; an IP network interface unit 151 for communicating IP packets-for call control data and IP packets for voice data with the IP network; a call connection command receiver 152 for processing a connection request command received by the IP network interface unit 151 and notifying a connection request to the server control unit 150; a SIP processing unit 154 connected to the IP network interface unit 151 for executing the SIP call control protocol; a SIP-T processing unit 155 connected to the above IP network interface unit 151 for executing the SIP-T call control protocol; a selector 153 for switching call control data paths to selectively connect either the above SIP processing unit 154 or SIP-T processing unit 155 to the server control unit 150, according to a call control protocol to be applied to automatic call redirecting service; and a protocol change command transmitter 156 for transmitting a protocol change command to a media gateway MG (1-1 or 1-2). The selector 153 switches the call control data paths from one to another in response to an instruction from the server control unit 150.

In the data base 7 for automatic call redirecting service, information such as service subscriber information and forwarding destination telephone numbers required to implement IP automatic call redirecting service is registered. FIG. 4 shows an example of data structure of the data base 7 for automatic call redirecting service.

In the database 7, a plurality of entries 75 (75-1, 75-2, etc.) each of which has a called telephone number corresponding to IP automatic call redirecting service subscriber information are registered. Each of the entries 75 specifies, in correspondence with a called telephone number 71, a forwarding destination telephone number 72, an exchange's code for redirected telephone (a forwarding destination exchange identifier) 73, and a forwarding destination IP address 74.

The forwarding destination telephone number 72 indicates a telephone number that the subscriber of automatic call redirecting service has registered in advance as the number to which the subscriber wants a call redirected. The forwarding destination exchange identifier 73 is the identifier (exchange's code) of an exchange that accommodates the forwarding destination telephone (PSTN telephone) or the identifier of an exchange located nearest to the forwarding destination telephone in the case where the forwarding destination telephone number 72 is the number of a PSTN telephone.

The forwarding destination IP address 74 indicates the IP address assigned to the forwarding destination telephone in the case where the forwarding destination telephone number 72 is the number of an IP telephone. The forwarding destination IP address 74 indicates the IP address assigned to the IP network interface 106 of the media gateway MG built in an exchange specified by the exchange identifier 73 in the case the forwarding destination telephone number 72 is the number of a PSTN telephone.

In FIG. 4, for example, entries 75-1 and 75-2, in which telephone numbers are registered as the forwarding destination telephone numbers 72, means that automatic call redirecting service is applied for the subscribers of the entries. Meanwhile, entry 75-N, in which no number is registered as the forwarding destination telephone number 72, means that automatic call redirecting service is not applied for the subscriber of the entry.

For entry 75-1, the telephone number registered as the forwarding destination telephone number 72 is a PSTN telephone number, not an I telephone number that begins with, for example, "050". Thus, the upper four digits of the destination telephone number are set as the forwarding destination exchange identifier 73 and the IP address assigned to the IP network interface 106 of the exchange having the identifier 73 is set as the forwarding destination IP address 74. The value of the forwarding destination IP address 74 is retrieved from, for-example, a table or data base (not shown in FIG. 2) indicating the correspondence relations between the identifiers of exchanges and the IP addresses of the IP network interfaces.

For entry 75-2, because the forwarding destination telephone number 72 is an IP telephone number beginning with "050," the forwarding destination exchange identifier 73 field is null and the IP address of the forwarding destination IP telephone is set as the forwarding destination IP address 74. In this case, the IP address of the forwarding destination IP telephone is retrieved from, for example, a table or data base (not shown in FIG. 2) indicating the correspondence relations between the forwarding destination telephone numbers and IP addresses.

Figure 5:
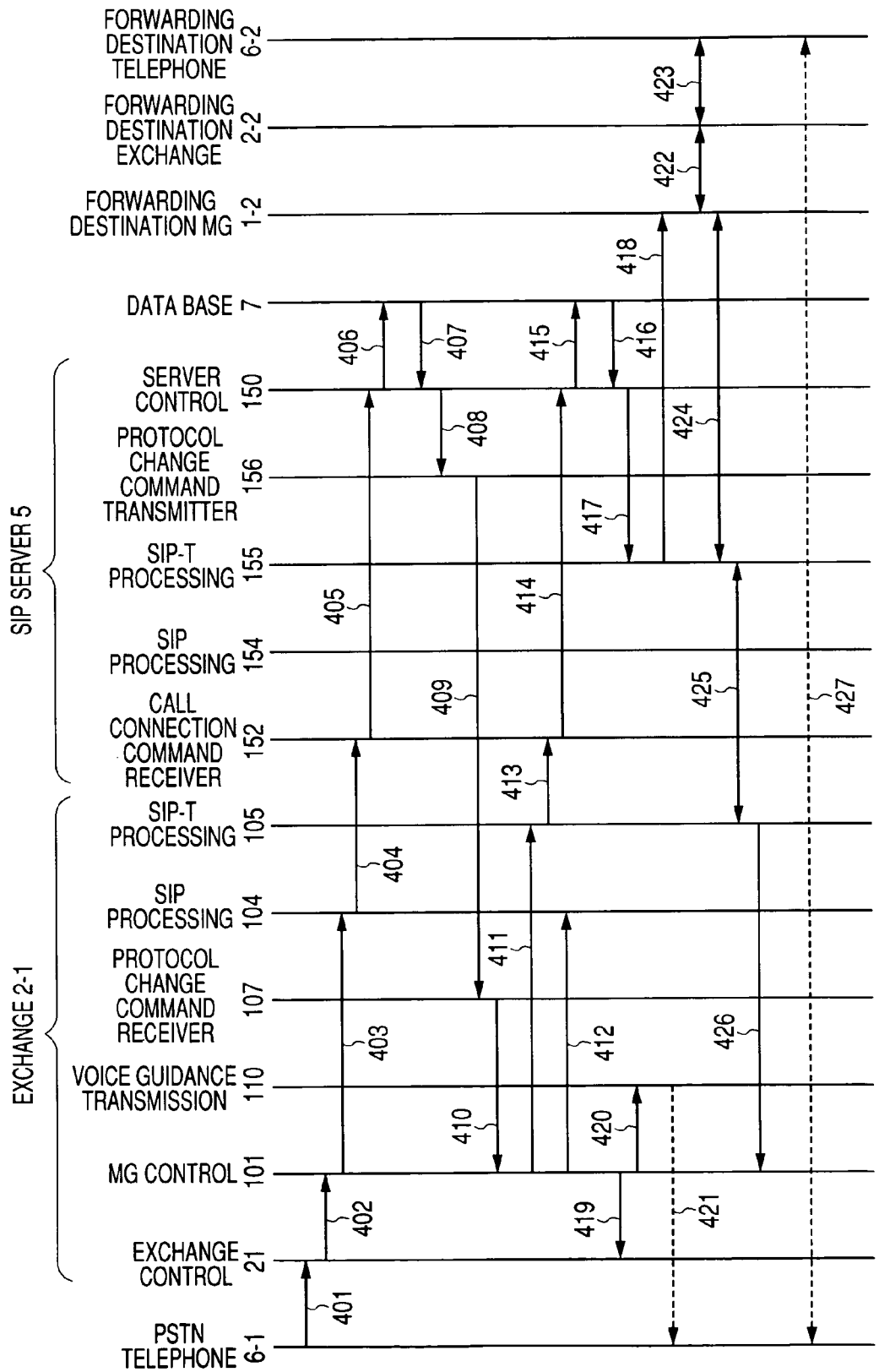
FIG. 5 shows an example of a call connection sequence for automatic call redirecting service according to the present invention.

FIG. 5 shows an example of a call connection sequence for automatic call redirecting service of the present invention, using the above exchanges provided with the built-in type MGs 2 having the protocol switching functions and the SIP server 5.

In the network of FIG. 3, when the PSTN telephone 6-1 connected to the exchange 2 originates a call addressed to the IP telephone 4 (401), the exchange control unit 21 of the exchange 2 that has detected the call origination sends a start command of call connection processing to the MG control unit 101 of the media gateway MG 1-1 (402). The start command includes information required for call connection such as the calling telephone number, called telephone number, and the like.

Upon receiving the start command, the MG control unit 101 determines whether the destination of the call is an IP terminal (IP telephone) or not, based on the called telephone number and controls the selector 103 to select the SIP processing unit 104 if the destination is an IP terminal or the SIP-T processing unit 105 if the call is to be relayed to another exchange.

In this example, because the number of the IP telephone 4 is specified as the called telephone number, the MG control unit 101 selects the SIP processing unit 104 and outputs a start command including the information required for call connection such as the calling telephone number, called telephone number, and the like to the SIP processing unit 104 (403).

Upon receiving the start command, the SIP processing unit 104 generates a call connection request command (INVITE signal) according to the SIP call control protocol specifications and sends the INVITE signal to the SIP server 5 (404). In the SIP server 5, the call connection command receiver 152 processes the INVITE signal and outputs INVITE information to the server control unit 150 (405).

The server control unit 150 refers to the data base 7 for automatic call redirecting service to determine whether the called telephone number specified in the INVITE information belongs to a subscriber of automatic call redirecting service (406) In this example, it is assumed that the user of the called IP telephone 4 is a subscriber of automatic call redirecting service and the number of the PSTN telephone 6-2 is registered as the forwarding destination telephone number 72. As the result of the data base search (407), the server control unit 150 recognizes that the forwarding destination of the call is the PSTN telephone 6-2. In this case, since the SIP-T must be applied as the call connection protocol, the server control unit 150 instructs the protocol change command transmitter 156 to switch the call control protocol from SIP to SIP-T (408). In consequence, a protocol change command is transmitted from the protocol change command transmitter 156 to the media gateway MG 1-1 of the calling side exchange (409).

By the way, if the forwarding destination is an IP telephone, call connection processing according to the SIP is executed between the SIP server 5 and the forwarding destination IP telephone. In this case, when the call connection is completed, a call connection complete notification is transmitted from the SIP processing unit 104 to the MG control unit 101 and the telephones at both ends can proceed to a speech state.

Figure 6:
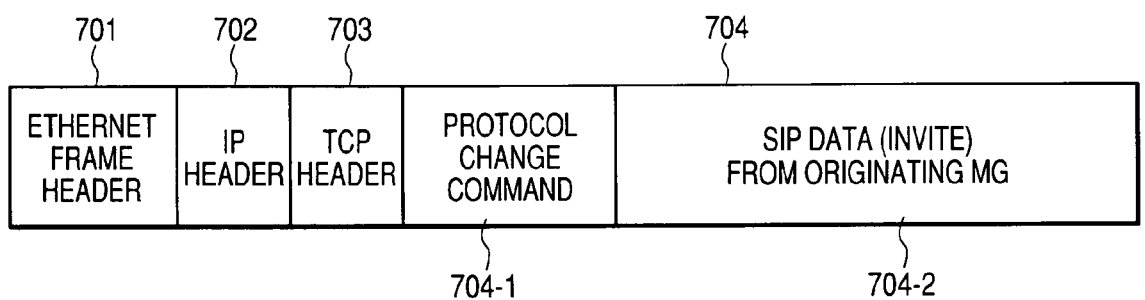
FIG. 6 shows an example a protocol change command frame format.

The protocol change command is transmitted with a frame which is, for example, as shown in FIG. 6, comprised of a packet header part (Ethernet frame header 701, IP header 702, TCP header 703) and a data part 704. The data part 704 is comprised of a command field 704-1 in which a code indicative of the protocol change command is set and an INVITE information field 704-2. The INVITE information field 704-2 includes call identification information such as Call-ID, the calling telephone number, the called telephone number, and the like, extracted from the INVITE signal received from the media gateway MG 1-1. Destination IP address and the like that must be specified in the packet header part is also derived from the received INVITE information. The protocol change command is received by the IP network interface 106 of the media gateway MG 1-1 and transferred to the MG control unit 101 via the protocol change command receiver 107 (410).

The MG control unit 101 specifies the call for which protocol change is required from the call identification information extracted from the received protocol change command and issues a start command of call connection processing for that specified call to the SIP-T processing unit (411). At the same time, the MG control unit 101 instructs the SIP processing unit 104 to stop (abort) the call connection processing for that specified call (412). According to the start command received from the MG control unit 101, the SIP-T processing unit 105 generates a call connection request command (INVITE signal) according to the SIP-T call control protocol and sends it to the SIP server 5 (413).

In the same way as the previous INVITE signal transmitted from the SIP processing unit 104, the INVITE signal transmitted from the SIP-T processing unit 105 is received by the call connection command receiver 152 of the SIP server 5 and INVITE information is input to the server control unit 150 (414).

The server control unit 150 refers to the data base 7 for automatic call redirecting service, based on the called telephone number specified in the INVITE information (415). As the result of the data base search (416), the server control unit 150 recognizes that the forwarding destination of the call is the PSTN telephone 6-2. At this time, since the INVITE information conforms to SIP-T, the server control unit 150 activates the SIP-T processing unit 155 (417) and the INVITE signal according to SIP-T can be sent to the media gateway MG 1-2 of the forwarding destination exchange 2-2 (418).

If it is desired that the exchange control unit 21 of the calling side exchange 2-1 manages information about the protocol type for each call, for example, as part of statistical information, the MG control unit 101 may notify the exchange control unit 21 of the call identification information and the execution of the protocol change using an internal command while the SIP server 5 is performing the transfer processing of the call connection request command (419).

When the call connection protocol change occurs during the call connection procedure, as described above, there is a possibility that it takes somewhat longer to complete connecting the call to the forwarding destination telephone. Thus, it is desirable to output voice guidance like, for example, "automatic call redirecting is now performed" to the calling telephone. In order to generate such voice guidance, the MG control unit may activate the vice guidance transmission unit 110 (420) so that the voice guidance generated by the vice guidance transmission unit 110 is transmitted through the speech path to the calling telephone 6-1 (421).

Upon receiving the INVITE signal from the SIP server 5, the media gateway MG 1-2 of the forwarding destination exchange 2-2 communicates information required for call connection with the exchange control unit 21 of the exchange 2-2, using internal commands (422). Based on this information, the exchange control unit 21 executes call connection processing with the forwarding destination telephone 6-2 (423).

When the forwarding destination telephone responds to the incoming call, a subsequent call connection procedure according to the SIP-T call control protocol is executed between the forwarding destination media gateway MG 1-2 and the calling side media gateway MG 1-1 via the SIP server 5 (424, 425). Upon completing the call connection processing with the forwarding destination media gateway MG 1-2, the SIP-T processing unit 105 of the calling side media gateway MG 1-1 sends a call connection complete notification to the MG control unit 101 (426). Then, a speech path is established between the calling telephone 6-1 and the forwarding destination telephone 6-2 (427).

Figure 7:
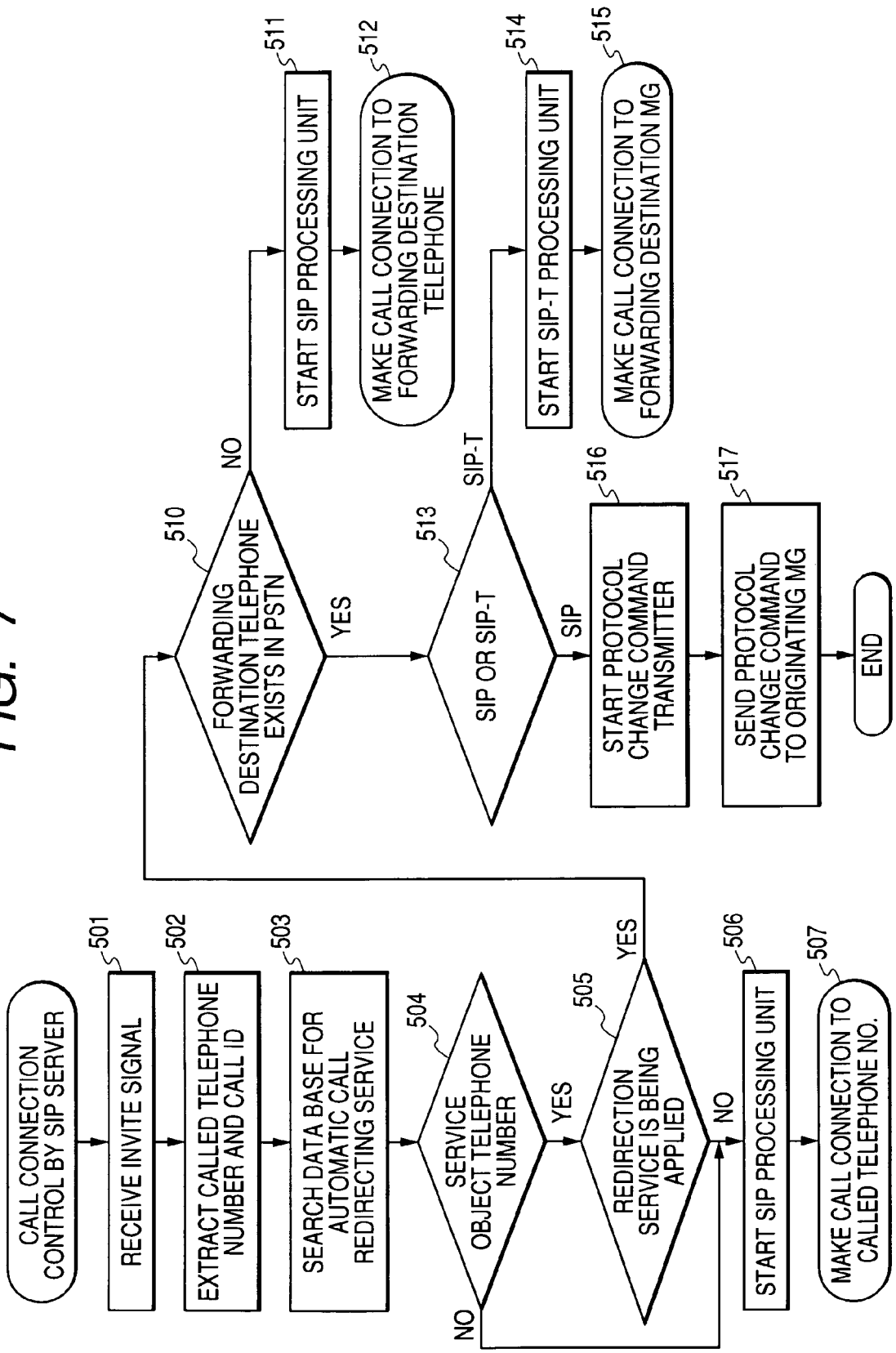
FIG. 7 is a flowchart showing call connection control operation of the SIP server.

FIG. 7 is a flowchart showing call connection control operation of the SIP server 5 making it possible to automatically redirect a call terminated on an IP telephone to a PSTN telephone according to the present invention.

Upon receiving an INVITE signal packet from the IP network 3 (501), the server control unit 150 of the SIP server 5 extracts control information such as the called telephone number, Call-ID, and the like, from the INVITE information field 704-2 (502). Based on the extracted called telephone number, the server control unit 150 searches the data base 7 for automatic call redirecting service (503) and determines whether the called telephone number belongs to a subscriber of automatic call redirecting service, depending on whether an entry matching with the called telephone number exists in the data base (504).

In the case where no entry matching with the called telephone number exists in the data base 7, that is, if automatic call redirecting service is not necessary for the called telephone number, the server control unit 150 activates the SIP processing unit (506) and executes a normal procedure for connecting the call to the called telephone number (507).

In the case where an entry matching with the called telephone number is found in the data base 7, that is, if the called telephone number belongs to a subscriber of automatic call redirecting service, the server control unit 150 determines whether automatic call redirecting service is being applied or not, depending on whether a forwarding destination number 72 is registered in the entry searched out (505). If no forwarding destination number 72 is registered in the entry, the server control unit 150 judges that automatic call redirecting service is not required for the call, activates the SIP processing unit 154 (506), and executes the normal procedure for connecting the call to the called telephone number (507).

If a forwarding destination number 72 is registered in the entry searched out, automatic call redirecting service must be applied to the call. In this case, the server control unit 150 checks the forwarding destination exchange identifier 73 in that entry and determines whether the forwarding destination telephone is an IP terminal or a PSTN telephone (510). If no valid data is set for the forwarding destination exchange identifier 73, the server control unit 150 judges that the forwarding destination telephone is an IP terminal (IP telephone), and activates the SIP processing unit (511), thereby to transmit a packet for call connection processing to the forwarding destination telephone (512). The packet includes the forwarding destination IP address 74 specified in the above entry as the IP packet destination address.

If a valid data is set for the forwarding destination exchange identifier 73, the entry indicates that the forwarding destination is a PSTN telephone. In this case, the server control unit 150 determines the type of the call control protocol running on the calling side media gateway MG based on the received INVITE information (513). If the type of the call control protocol is SIP-T, the server control unit 150 activates the SIP-T processing unit 155 (514), thereby to execute call connection processing with the media gateway MG of the forwarding destination exchange according to the call control protocol SIP-T (515). If the type of the call control protocol is SIP, the server control unit 150 instructs the protocol change command transmitter 156 (516) to send the protocol change command to the calling side media gateway MG (517).

Figure 8:
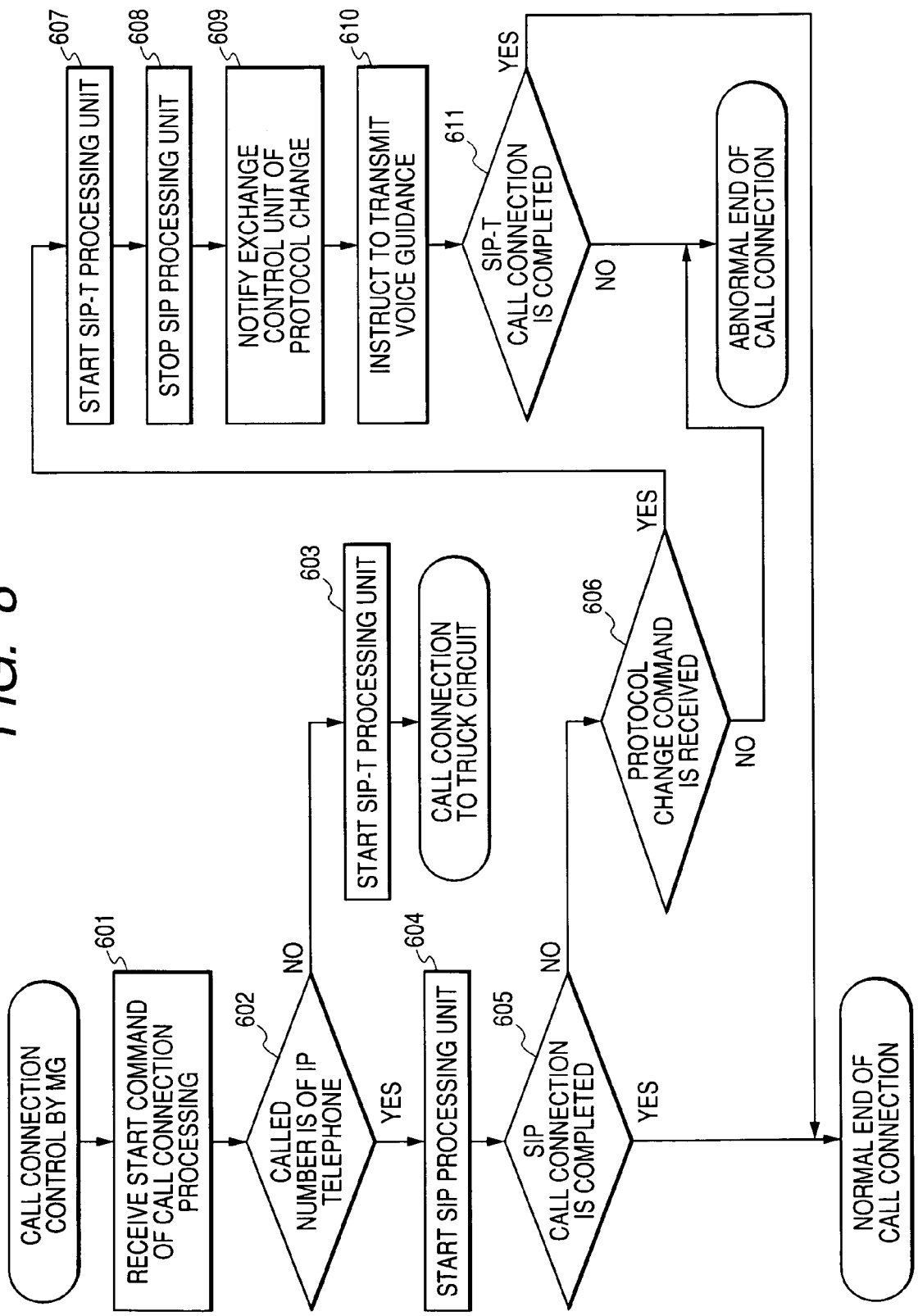
FIG. 8 is a flowchart showing call connection control operation of the media gateway MG.

FIG. 8 is a flowchart showing call connection control operation of the media gateway 1 making it possible to automatically redirect a call terminated on an IP telephone to a PSTN telephone according to the preset invention.

Upon receiving a start command of call connection processing from the exchange control unit 21, the MG control unit 101 analyzes the upper digits of the called telephone number specified in the start command to determine whether the called terminal is an IP terminal (IP telephone) or not (602). In the case where the called terminal is not an IP telephone (or IP terminal) that is, if the call must be relayed to another exchange, the MG control unit 101 activates the SIP-T processing unit 105 (603), thereby to start call connection processing for relaying the call to another exchange via a trunk circuit. In the case where the called terminal is an IP telephone, the MG control unit 101 activates the SIP processing unit 104 (604).

The MG control unit 101 waits for a call connection complete notification from the SIP processing unit (605). Upon receiving the call connection complete notification from the SIP processing unit 104, the MG control unit 101 terminates the call connection processing and proceeds to the speech state. If the protocol change command is received from the SIP server 5 during the SIP call connection processing is performed (606), the MG control unit 101 activates the SIP-T processing unit 105 (607). After starting the SIP-T call connection processing, the MG control unit 101 instructs the SIP processing unit 104 to stop (abort) its call connection processing for the call specified by the protocol change command (608).

In the present embodiment, after stopping the call connection processing of the SIP processing unit 104, the MG control unit 101 notifies the exchange control unit 21 of occurrence of the protocol change (609) using internal commands, and instructs the voice guidance transmission unit 110 to send voice guidance (610) in order to inform the caller that automatic call redirecting is being performed. The MG control unit 101 waits for a response from the SIP-T processing unit 105 and, upon receiving a call connection complete notification (611), terminates the call connection processing, and proceeds to the speech state. In the case where a call connection complete notification cannot be received from the SIP-T processing unit 105 or a response, which is not the call connection complete notification nor a protocol change command, is received in steps 605, 606, the MG control unit 101 terminates the call connection processing abnormally.

In the flowchart for call connection control shown in FIG. 7, when protocol change occurs, the SIP server activates the SIP-T processing unit 155 in step 514 after re-executing the steps 501 to 505, 510 to 513 in response to the second call connection request applying a protocol different from that of the first call connection request having been received from the calling side media gateway MG.

In order to speed up the call control operation of the SIP server 5, as an example of modification to the above embodiment, for example, the server control unit 150 may store, in step 516, the call identification information (Call-ID) of the call for which protocol change is required, so that when a call connection request (INVITE signal) is received, the SIP server 5 can check whether the Call-ID extracted in step 502 is that stored as the call required for protocol change. If so, steps 501 to 505 and 510 are skipped and steps 513 to 515 can be executed immediately.

There exists a charging system in PSTN automatic call redirecting service that charges connection fees for the line from a calling telephone to a called telephone dialed by the calling user to the calling party, and connection fees for the line from the called telephone to a forwarding destination telephone to the called party. In this case, charging to the called party is responsible for the exchange that accommodates the called telephone.

If such a charging system is applied to automatic call redirecting service for IP telephones, the SIP server 5 takes the same role as the exchange that accommodates the called telephone (IP telephone) Also, the SIP server 5 monitors a call for which automatic call redirecting service is applied after the call is connected to its forwarding destination until released. Thus, by providing the SIP server 5 with the charging function, automatic call redirecting service can be provided, using the same charging system as the existing system.

While, in the described embodiment, the protocol change command is transmitted from the SIP server 5 to the media gateway in a particular format of frame as illustrated in FIG. 6, the protocol change command may be defined as one of SIP commands.

According to the present invention, the media gateway built in an exchange starts call connection processing according to a first call control protocol, in response to the call connection command for a call origination from any PSTN telephone, if the called terminal is an IP terminal connected to the IP network and starts call connection processing according to a second call control protocol if the called terminal is a PSTN telephone belonging to another exchange connected to the IP network. Further, when receiving a connection protocol change command from the IP call connection controller before completing the call connection according to the first call control protocol, the media gateway aborts the call connection processing according to the first call control protocol and starts call connection processing according to the second call control protocol. Therefore, even in the case where the user of a called IP terminal has designated, as a redirecting destination, a PSTN terminal to which a call for the IP terminal will be forwarded through another exchange, automatic call redirecting service can be performed by switching connection protocol from one to another.

What is claimed is:

1. A media gateway, built in an exchange capable of accommodating a plurality of Public Switched Telephone Network (PSTN) telephones, for performing conversion between voice signals and IP packets, said media gateway comprising:
    a media gateway control unit connected to a control unit of the exchange; an IP network interface connected to an IP network;
    a first protocol processing unit for executing a call connection procedure according to a first call control protocol by communicating messages with an IP call connection controller on said IP network via said IP network interface; and
    a second protocol processing unit for executing a call connection procedure according to a second call control protocol by communicating messages with said IP call connection controller via said IP network interface;
    wherein said media gateway control unit instructs said first protocol processing unit to start call connection processing according to the first call control protocol in response to a call connection command issued from said exchange control unit when a call is originated from any of said PSTN telephones, aborts the call connection processing of said first protocol processing unit while maintaining the connection between the PSTN telephone and the media gateway when receiving a connection protocol change command from said IP call connection controller via said IP network interface before completing the call connection according to the first call control protocol, and instructs said second protocol processing unit to start call connection processing according to the second call control protocol.

2. The media gateway according to claim 1, wherein said media gateway control unit instructs said first protocol processing unit to start call connection processing according to the first call control protocol when a called terminal specified in said call connection command is an IP terminal connected to said IP network, and instructs said second protocol processing unit to start call connection processing according to the second call control protocol when the called terminal is a PSTN telephone which belongs to another exchange connected to said IP network.

3. The media gateway according to claim 1, wherein said first call control protocol is a Session Initiation Protocol (SIP) specified in RFC 3261 and said second call control protocol is a SIP for Telephone (SIP-T) specified in RFC 3204.

4. An automatic call redirecting service system comprising an exchange capable of accommodating a plurality of Public Switched Telephone Network (PSTN) telephones and an IP call connection control server connected to an IP network,
    said exchange being provided with a built-in type media gateway connected to the IP network for performing conversion between voice signals and IP packets,
    said media gateway comprising a media gateway control unit connected to a control unit of the exchange, an IP network interface connected to the IP network, a first protocol processing unit for executing a call connection procedure according to a first call control protocol by communicating messages with said IP call connection control server via said IP network interface, and a second protocol processing unit for executing a call connection procedure according to a second call control protocol by communicating messages with said IP call connection control server via said IP network interface,
    said IP call connection control server comprising a data base for storing a plurality of entries each indicating a forwarding destination telephone number and a forwarding destination IP address in correspondence with a registered telephone number, and a server control unit for referring to the data base, upon receiving a call connection request from said media gateway, based on a called telephone number specified in the call connection request to judge whether the protocol of the call connection request is appropriate or not, depending on whether the called telephone number is registered in the data base and the type of the forwarding destination telephone number registered in correspondence with the called telephone number, and sending a connection protocol change command to said media gateway if it is judged that the call control protocol of the call connection request is inappropriate,
    wherein said media gateway control unit instructs said first protocol processing unit to start call connection processing according to the first call control protocol in response to a call connection command issued from said exchange control unit when a call is originated from any of said PSTN telephones, aborts the call connection processing of said first protocol processing unit while maintaining the connection between the PSTN telephone and the media gateway when receiving the connection protocol change command from said IP call connection control server via said IP network interface before completing the call connection according to the first call control protocol, and instructs said second protocol processing unit to start call connection processing according to the second call control protocol.

5. The automatic call redirecting service system according to claim 4, wherein said media gateway control unit instructs said first protocol processing unit to start call connection processing according to the first call control protocol when a called terminal specified in said call connection command from said exchange control unit is an IP terminal connected to said IP network, and instructs said second protocol processing unit to start call connection processing according to the second call control protocol when the called terminal is a PSTN telephone accommodated to another exchange connected to said IP network.

6. The automatic call redirecting service system according to claim 4, wherein said server control unit refers to said data base upon receiving a call connection request from said media gateway, based on the called telephone number specified in the request, executes call connection processing with a forwarding destination terminal having the forwarding destination telephone number when the forwarding destination telephone number has been registered in correspondence with the called telephone number, and executes call connection processing with a terminal having the called telephone number when the called telephone number or the forwarding destination telephone number is not registered.

7. The automatic call redirecting service system according to claim 4, wherein said server control unit sends said connection protocol change command when the protocol of the call connection request received from said media gateway is the first call control protocol and the forwarding destination telephone number registered in said data base is the number of a PSTN telephone.

8. The automatic call redirecting service system according to claim 4, wherein said first call control protocol is SIP specified in RFC 3261 and said second call control protocol is SIP-T specified in RFC 3204.

9. An IP call connection controller connected to an IP network, comprising:

a data base for storing relations each indicating a forwarding destination telephone number and a forwarding destination IP address in correspondence with a registered telephone number; and a control unit for referring to said data base upon receiving a call connection request specifying a called telephone number from said IP network, based on the called telephone number specified in the call connection request to judge whether the protocol of the call connection request is appropriate or not, depending on whether the called telephone number is registered in the data base and the type of the forwarding destination telephone number registered in correspondence with the called telephone number, and sending a connection protocol change command to a node that sent said call connection request if it is judged that the call control protocol of the call connection request is inappropriate.

10. The IP call connection controller according to claim 9, wherein, if the protocol of said call connection request is SIP specified in RFC 3261 and the forwarding destination telephone number registered in said data base is the number of a PSTN telephone, said control unit sends a connection protocol change command to change the connection protocol from SIP to SIP-T specified in RFC 3204 to a node that sent said call connection request.

* * * * *

UNITED STATES PATENT AND TRADEMARK OFFICE
CERTIFICATE OF CORRECTION

PATENT NO. : 7,583,659 B2  Page 1 of 1
APPLICATION NO. : 10/901500
DATED : September 1, 2009
INVENTOR(S) : Matsuhashi et al.

It is certified that error appears in the above-identified patent and that said Letters Patent is hereby corrected as shown below:

Title Page:

At Item [75] Inventors,

"Satoshi Matsuhashi, Yokahama (JP)"

should read,

--Satoshi Matsuhashi, Yokohama (JP)--

Signed and Sealed this

Eighth Day of December, 2009

David J. Kappos
*Director of the United States Patent and Trademark Office*